UNITED STATES PATENT OFFICE.

WILLIAM JOHN ALEXANDER DONALD, OF CASTLE PARK HOUSE, SCOTLAND.

PROCESS OF MAKING CHROMATES.

SPECIFICATION forming part of Letters Patent No. 442,109, dated December 9, 1890.

Application filed January 30, 1889. Serial No. 298,094. (No specimens.) Patented in England April 5, 1888, No. 5,086.

*To all whom it may concern:*

Be it known that I, WILLIAM JOHN ALEXANDER DONALD, chemical manufacturer, a subject of the Queen of Great Britain, residing at Castle Park House, in the county of Ayr, North Britain, have invented certain new and useful Improvements in the Manufacture of Chromates, (for which I have obtained Letters Patent in Great Britain, No. 5,086, granted April 5, 1888,) of which the following is a specification.

In manufacturing chromates chrome ore containing, by preference, from fifty to fifty-six per cent. of chromium sesquioxide, after being finely ground, is mixed with lime and potash, or soda or other salt, according to the form of chromate desired to be produced, such salt being either in the form of carbonate or hydrate, or sulphate in aqueous solution. This mixture in charges of a convenient quantity is then oxidized in a reverberatory furnace until the oxide of chromium has been converted into a chromate of the salt with which it was mixed.

In practice a considerable percentage of the oxide of chromium proves unavailable, part of it remaining in its original state, another portion entering into combination with the lime, while still another portion, after having been converted into chromate of calcium, is again reduced to the state of an oxide.

The mixture, after being treated in the furnace, as above described, is lixiviated with water, which dissolves out the soluble chromate. The remaining chromic oxide, together with the lime and foreign matter contained in the chrome ore, remains as an insoluble unavailable residuum, which has hitherto in this manufacture been treated as valueless and thrown away. This insoluble residuum, commonly called "chrome waste," when dried, contains from, say, sixty to seventy per cent. of lime and from two and a half to five per cent. of chromic oxide or more. I have discovered a novel way of treating this insoluble residuum so that it may be used for mixing with chrome ore instead of fresh lime, thus attaining a great economy both of the lime and of the ore.

The subject-matter claimed is hereinafter specified.

In order to carry out my invention in the best way now known to me, the moist chrome waste resulting from the lixiviation of the mixture hereinbefore described is preferably air-dried; or, if desired, it may be passed directly into a reverberatory furnace or kiln and heated to a bright-red heat. When drawn out and allowed to cool, it is ready for use in place of fresh lime, and by a repetition of this treatment of heating and cooling it can be used again and again until impurities accumulate too greatly in it—say five or six times. The heating of this residuum or chrome waste produces two important effects—first, it reduces the material to a powder finer than could be ordinarily obtained by grinding, and, secondly, it renders the lime contained therein capable of chemically combining with water. In fact, without this capability the chrome waste would be wholly useless in the process, and it would be better to use fresh quicklime, for lime is required to absorb the water from the solution of the salt used, and so to yield a dry mixture ready for the furnace. The salt is always added in a state of solution, as otherwise it would not be so economical or work so well. In using this calcined waste a proportionate quantity of lime and chrome ore is omitted in the composition of each succeeding charge.

It will thus be seen that one of the distinguishing characteristics of my invention is this substitution of the calcined chrome waste for the lime and chrome ore, and not the mere reuse of the chrome ore as it is left by the lixiviation process.

The apparatus employed is too well known to require description.

What I claim as of my own invention, and desire to secure by Letters Patent, is—

1. The hereinbefore-described improvement in the process of manufacturing chromates, which consists in calcining the insoluble residuum resulting from the ordinary manufacture of such chromates to pulverize it and then mixing this powder with chrome ore, lime, and a liquid solution of the salt to be produced, substantially as hereinbefore set forth.

2. The hereinbefore-described improvement in the process of manufacturing chromates, which consists in calcining the insoluble residuum resulting from the ordinary manufacture of such chromates to pulverize it and then mixing this powder with chrome ore, lime, and a liquid solution of the salt to be produced, oxidizing the mixture in a furnace, withdrawing it therefrom, lixiviating the mixture to extract the soluble chromates, reheating the insoluble residuum, again mixing it with the ingredients hereinbefore mentioned, and repeating the treatment, as above described.

3. The hereinbefore-described improvement in the process of manufacturing chromates, which consists in mixing pulverized chrome ore, lime, and the salt desired in aqueous solution, heating the mixture, lixiviating it to dissolve out the soluble chromates, heating the insoluble residuum, mixing it with a proportionate quantity of chrome ore, lime, and the salt desired in solution, and then reheating and relixiviating the mixture, substantially as hereinbefore set forth.

WILLIAM JOHN ALEXANDER DONALD.

Witnesses:
SAMUEL HUNTER,
ANDR. W. LENNAN,
Both of 77 St. Vincent Street, Glasgow.